(12) United States Patent
Jarosinski et al.

(10) Patent No.: US 8,906,130 B2
(45) Date of Patent: Dec. 9, 2014

(54) COATINGS AND POWDERS, METHODS OF MAKING SAME, AND USES THEREOF

(75) Inventors: William John Crim Jarosinski, Carmel, IN (US); Vladimir Belov, Zionsville, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 321 days.

(21) Appl. No.: 12/762,626

(22) Filed: Apr. 19, 2010

(65) Prior Publication Data

US 2011/0254230 A1 Oct. 20, 2011

(51) Int. Cl.
*C22C 27/06* (2006.01)
*C22C 30/00* (2006.01)
*C22C 29/06* (2006.01)
*F16J 9/26* (2006.01)

(52) U.S. Cl.
CPC ............... *C22C 30/00* (2013.01); *C22C 27/06* (2013.01); *C22C 29/067* (2013.01); *F16J 9/26* (2013.01)
USPC ............... 75/240; 75/343; 75/351; 277/444; 420/428; 420/588; 428/402; 428/220; 428/141

(58) Field of Classification Search
CPC ............. C22C 27/06; C22C 30/00; F16J 9/26
USPC ........................................................... 75/240
See application file for complete search history.

(56) References Cited

U.S. PATENT DOCUMENTS

| | | | |
|---|---|---|---|
| 2,714,563 A | 8/1955 | Poorman et al. | |
| 3,556,747 A | 1/1971 | Hyde et al. | |
| 4,334,927 A | 6/1982 | Hyde et al. | |
| 4,519,840 A | 5/1985 | Jackson et al. | |
| 4,597,939 A | 7/1986 | Neuhauser et al. | |
| 4,612,256 A | 9/1986 | Neuhauser et al. | |
| 4,626,476 A | 12/1986 | Londry et al. | |
| 4,756,841 A | 7/1988 | Buran et al. | |
| 5,141,571 A * | 8/1992 | DuBois | 148/427 |
| 5,449,562 A | 9/1995 | Coulon | |
| 5,603,076 A | 2/1997 | Sampath | |
| 5,641,580 A * | 6/1997 | Sampath et al. | 428/663 |
| 5,863,618 A | 1/1999 | Jarosinski et al. | |
| 6,503,290 B1 | 1/2003 | Jarosinski et al. | |
| 6,887,585 B2 | 5/2005 | Herbst-Dederichs | |
| 7,001,670 B2 | 2/2006 | Herbst-Dederichs | |
| RE39,070 E | 4/2006 | Stong et al. | |
| 7,291,384 B2 | 11/2007 | Obara et al. | |
| 2005/0260436 A1 | 11/2005 | Einberger et al. | |
| 2007/0210524 A1 | 9/2007 | Herbst-Dederichs | |
| 2008/0274010 A1 | 11/2008 | Jarosinski et al. | |

FOREIGN PATENT DOCUMENTS

| | | |
|---|---|---|
| DE | 10061751 (C1) | 7/2002 |
| JP | 2007-314839 | 12/2007 |

* cited by examiner

*Primary Examiner* — Jessee Roe
*Assistant Examiner* — Christopher Kessler
(74) *Attorney, Agent, or Firm* — Nilay S. Dalal; Robert J. Hampsch

(57) ABSTRACT

This invention relates to thermal spray coatings, powders useful in deposition of the thermal spray coatings, methods of producing the powders, and uses of the thermal spray coatings, for example, coating of piston rings and cylinder liners of internal combustion engines. The coatings of this invention are applied by thermal spray deposition of a powder. The powder contains bimetallic carbides of chromium and molybdenum dispersed in a matrix metal. The matrix metal contains nickel/chromium/molybdenum.

18 Claims, 1 Drawing Sheet

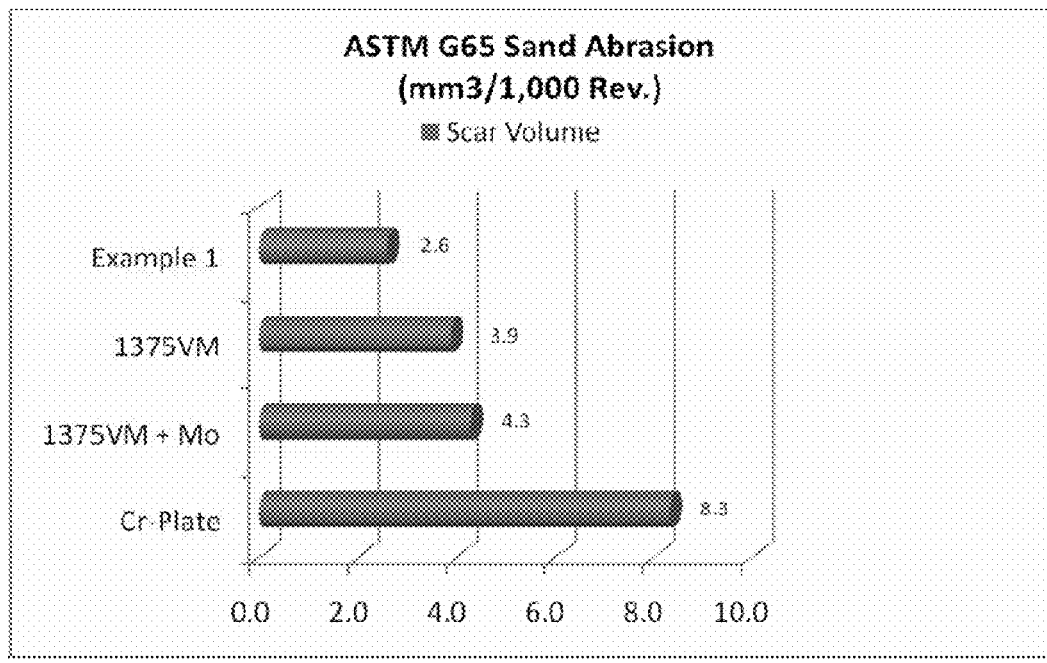

US 8,906,130 B2

COATINGS AND POWDERS, METHODS OF MAKING SAME, AND USES THEREOF

FIELD OF THE INVENTION

This invention relates to thermal spray coatings, powders useful in deposition of the thermal spray coatings, methods of producing the powders, and uses of the thermal spray coatings, for example, coating of piston rings and cylinder liners of internal combustion engines.

BACKGROUND OF THE INVENTION

As new technologies continue to be developed resulting in internal combustion engines, compressors, etc. having increasingly higher performance criteria such as higher power generation, it has required that certain components of the internal combustion engines, compressors, etc., especially the surfaces of components in sliding contact with surfaces of other components such as piston rings and cylinder liners, have increasingly better wear, scuffing, peeling and corrosion resistance.

The outer peripheral surfaces of piston rings and in some cases cylinder liners made of cast iron or steel have been subjected to various surface treatments over the years. Such treatments have included, for example, nickel composite plating, hard chromium plating, thermal spray treatments, and the like.

For example, U.S. Pat. No. 6,562,480 B1 discloses a wear resistant coating for protecting a surface undergoing sliding contact with another surface such as piston rings and cylinder liners of internal combustion engines. The wear resistant coating is applied by HVOF deposition of a powder which comprises a blend of about 13 weight percent to about 43 weight percent of a nickel-chromium alloy, about 25 weight percent to about 64 weight percent chromium carbide, and about 15 weight percent to about 50 weight percent molybdenum.

While some of the surface treatments have been found to be suitable for certain applications, the newer technologies require improved surface treatments that provide excellent wear, scuffing, peeling and/or corrosion resistance, in particular for applications involving surfaces of components in sliding contact with surfaces of other components such as piston rings and cylinder liners. Current surface treatments have been found to be inadequate in one or more properties for the newer technologies.

Especially for the newer internal combustion engine, e.g., diesel, and compressor technologies having increasingly higher performance criteria, a need exists for powders and coatings that can be deposited by thermal spray devices and that exhibit excellent wear, scuffing, peeling and/or corrosion resistance. A need exists for developing new powders and for thermal spray deposition of wear, scuffing, peeling and corrosion resistant coatings for components of the internal combustion engines, compressors, etc. It would be desirable in the art to provide powders and coatings that can be deposited by thermal spray devices and that exhibit excellent wear, scuffing, peeling and corrosion resistance for components of the internal combustion engines, compressors, etc.

SUMMARY OF THE INVENTION

This invention relates in part to a powder useful for deposition through a thermal spray device, said powder comprising bimetallic carbides of chromium and molybdenum dispersed in a matrix metal, said matrix metal comprising nickel/chromium/molybdenum.

This invention also relates in part to a process for preparing a powder useful for deposition through a thermal spray device, said powder comprising bimetallic carbides of chromium and molybdenum dispersed in a matrix metal, said matrix metal comprising nickel/chromium/molybdenum; wherein said process comprises (i) providing a blend of $Cr_3C_2$, NiCr and $MoO_x$ (wherein x is a value of from about 0 to about 3), (ii) subjecting said blend to a reducing atmosphere, e.g., hydrogen, under conditions sufficient to produce said bimetallic carbides of chromium and molybdenum, and (iii) dispersing said bimetallic carbides of chromium and molybdenum in said matrix metal.

This invention further relates in part to a coating deposited by a thermal spray device, said coating comprising bimetallic carbides of chromium and molybdenum dispersed in a matrix metal, said matrix metal comprising nickel/chromium/molybdenum.

This invention yet further relates in part to a coating applied by thermal spray deposition of a powder, said powder comprising bimetallic carbides of chromium and molybdenum dispersed in a matrix metal, said matrix metal comprising nickel/chromium/molybdenum.

This invention also relates in part to a piston ring having a wear resistant coating deposited by a thermal spray device, said coating comprising bimetallic carbides of chromium and molybdenum dispersed in a matrix metal, said matrix metal comprising nickel/chromium/molybdenum.

This invention further relates in part to a piston ring having a wear resistant coating applied by thermal spray deposition of a powder, said powder comprising bimetallic carbides of chromium and molybdenum dispersed in a matrix metal, said matrix metal comprising nickel/chromium/molybdenum.

The thermal spray coatings of this invention are useful in a variety of applications. In addition to coatings for piston rings and cylinder liners of internal combustion engines, the coatings of this invention are useful for extending the life of components in environments requiring wear resistance, corrosion resistance and/or high temperature resistance.

BRIEF DESCRIPTION OF THE DRAWINGS

FIG. 1 is a graphical representation of sand abrasion for the materials identified in Examples 1 and 2. FIG. 1 shows the material volume removed by sand in $mm^3$ per 1,000 revolutions. As shown in FIG. 1, less volume loss represents a more wear resistant material.

DETAILED DESCRIPTION OF THE INVENTION

As indicated above, this invention relates to wear resistant powders useful for deposition through thermal spray devices such as plasma, HVOF or detonation gun. The powders contain bimetallic carbides of chromium and molybdenum dispersed in a matrix metal. The matrix metal contains nickel/chromium/molybdenum. The powders are useful for forming wear resistant coatings having the same composition.

The powders of this invention contain from about 45 to about 75 weight percent chromium, from about 8 to about 35 weight percent molybdenum, from about 10 to about 30 weight percent nickel, and from about 3 to about 8 weight percent carbon. Preferably, the powders of this invention contain from about 50 to about 70 weight percent chromium, from about 12 to about 30 weight percent molybdenum, from about 15 to about 25 weight percent nickel, and from about 3.5 to about 6.5 weight percent carbon.

The powders of this invention comprise agglomerated particles. The particles are comprised of bimetallic carbides of chromium and molybdenum dispersed in a matrix metal. The matrix metal contains nickel/chromium/molybdenum. The powder particles have an average particle size (agglomerated) of from about 5 micrometers to about 55 micrometers, preferably from about 15 micrometers to about 50 micrometers, and more preferably from about 20 micrometers to about 45 micrometers. The average particle size of the thermal spraying powders is preferably set according to the type of thermal spray device and thermal spraying conditions used during thermal spraying.

The bimetallic carbides of chromium and molybdenum have an average particle or grain size of less than about 8 microns, preferably less than about 4 microns, and more preferably less than about 2 microns. These particles are dispersed in a metal matrix to form the agglomerated particles described above.

The powders of this invention can contain a large volume of bimetallic carbides of chromium and molybdenum for imparting excellent wear resistance to coatings made therefrom. Powders of this invention containing less than about 45 weight percent chromium may exhibit inadequate wear and corrosion resistance for many applications. Chromium levels in excess of about 75 weight percent may tend to detract from the wear resistance of the coating because the coating may become too brittle. Powders containing less than about 8 weight percent molybdenum may exhibit inadequate wear resistance for many applications. Molybdenum levels in excess of about 35 weight percent may tend to detract from the wear resistance of the coating because the coating may become brittle and lead to increased peeling.

The carbon concentration controls the volume percent of carbide phases. A large volume percent of carbide phases increases the hardness and improves the wear properties of coatings formed with the powders. A minimum of about 3 weight percent carbon may be necessary to impart adequate hardness into the coatings. If the carbon exceeds about 8 weight percent, the volume percent of carbide phases may become too high causing brittleness.

Increasing the concentration of nickel may tend to increase the deposition efficiency for thermal spraying the powders. Because total nickel levels above about 30 weight percent may tend to soften the coating and limit the wear resistance of the coating, the total concentration of nickel may best be maintained above about 10 weight percent and below about 30 weight percent.

The thermal spraying powders useful in this invention can be produced by agglomeration (spray dry and sinter or sinter and crush methods). In a spray dry and sinter method, a slurry is first prepared by mixing a plurality of raw material powders and a suitable dispersion medium. This slurry is then granulated by spray drying, and a coherent powder particle is then formed by sintering the granulated powder. The thermal spraying powder is then obtained by sieving and classifying (if agglomerates are too large, they can be reduced in size by crushing). The sintering temperature during sintering of the granulated powder is preferably 1000 to 1300° C.

In the sinter and crush method, a compact is first formed by mixing a plurality of raw material powders followed by compression and then sintered at a temperature between 1100 to 1400° C. The thermal spraying powder is then obtained by crushing and classifying the resulting sintered compact into the appropriate particle size distribution.

If the average particle size of a raw material powder is too small, raw material costs may be prohibitive. If the average particle size of a raw material powder is too large, it may become difficult to uniformly disperse the raw material powder. The raw material particle size is preferably no greater than about 10 microns.

The individual particles that compose the thermal spraying powder preferably have enough mechanical strength to stay coherent during the thermal spraying process. If the mechanical strength is too small, the powder particle may break apart clogging the nozzle or accumulate on the inside walls of the thermal spray device.

In particular, methods of making the thermal spray powders of this invention can include CrC/NiCr+MoOx (reduce) processes and CrC+NiCr+MoOx (reduce) processes (wherein x is a value of from about 0 to about 3). The CrC/NiCr+MoOx (reduce) process is carried out in Example 1 hereinbelow. This process involves taking CrC/NiCr (already agglomerated and sintered) and adding MoOx followed by reduction (sintered for a second time). The CrC+NiCr+MoOx (reduce) process can involve fewer steps by starting with 3 components, i.e., CrC+NiCr+MoOx, and then sintering followed by reduction, thereby eliminating a sintering step.

Alternatively, the powders of this invention may be produced by means of inert gas atomization of a mixture of elements in the proportions stated herein. Preferred atomization methods that may be employed in making the powders of this invention are described in U.S. Pat. No. 5,863,618, the disclosure of which is incorporated herein by reference. The raw materials of these powders are typically melted at a temperature of about 1600° C. and then atomized in a protective atmosphere (e.g., argon, helium or nitrogen). Most advantageously the atmosphere is argon. A nitrogen atmosphere may be employed which may result in the formation of additional hard phases interspersed throughout the alloys, e.g., nitrides. As indicated above, to facilitate melting for atomization, the alloy may optionally contain melting point suppressants like boron, silicon and manganese.

Preferably, the thermal spraying powders useful in this invention can be prepared by (i) providing a blend of Cr3C2, NiCr and MoOx (wherein x is a value of from about 0 to about 3), (ii) subjecting the blend to a reducing atmosphere, e.g., hydrogen, under conditions sufficient to produce bimetallic carbides of chromium and molybdenum, and (iii) dispersing the bimetallic carbides of chromium and molybdenum in a matrix metal. The blend of Cr3C2, NiCr and MoOx, e.g., Cr3C2/NiCr and MoOx, can be reduced in a hydrogen pusher furnace and then further reduced in a vacuum furnace. Hydrogen reduces some of the oxide (forming H2O) but carbon from the chromium carbide can also reduce the molybdenum oxide (forming CO/CO2). The resulting carbides are bimetallic carbides of chromium and molybdenum. Illustrative bimetallic carbides of chromium and molybdenum include, for example, MC, M2C, M3C2, M7C3, M23C6, M6C, (wherein M is chromium and molybdenum) and the like.

Coatings may be produced using the powders of this invention by a variety of methods well known in the art. These methods include thermal spray (plasma, HVOF, detonation gun, etc.), laser cladding; and plasma transferred arc (PTA). Thermal spray is a preferred method for deposition of powders to form the coatings of this invention. The powders of this invention are useful for forming wear resistant coatings having the similar composition.

The coating process involves flowing powder through a thermal spraying device that heats and accelerates the powder onto a substrate. Upon impact, the heated particle deforms resulting in a thermal sprayed lamella or splat. Overlapping splats make up the coating structure. A detonation process is disclosed in U.S. Pat. No. 2,714,563, the disclosure of which is incorporated herein by reference. The detonation process is further disclosed in U.S. Pat. Nos. 4,519,840 and 4,626,476, the disclosures of which are incorporated herein by reference. U.S. Pat. No. 6,503,290, the disclosure of which is incorporated herein by reference, discloses a high velocity oxygen fuel (HVOF) process.

The coatings of this invention contain from about 45 to about 75 weight percent chromium, from about 8 to about 35 weight percent molybdenum, from about 10 to about 30 weight percent nickel, and from about 3 to about 8 weight percent carbon. Preferably, the coatings of this invention contain from about 50 to about 70 weight percent chromium, from about 12 to about 30 weight percent molybdenum, from about 15 to about 25 weight percent nickel, and from about 3.5 to about 6.5 weight percent carbon.

The coatings of this invention can contain a large volume of chromium and molybdenum for imparting excellent wear resistance to coatings made therefrom. Coatings containing less than about 45 weight percent chromium may exhibit inadequate wear and corrosion resistance for many applications. Chromium levels in excess of about 75 weight percent may tend to detract from the wear resistance of the coating because the coating may become too brittle. Coatings containing less than about 8 weight percent molybdenum may exhibit inadequate wear resistance for many applications. Molybdenum levels in excess of about 35 weight percent may tend to detract from the wear resistance of the coating because the coating may become brittle and lead to increased peeling.

The carbon concentration controls the volume percent of carbide phases. A large volume percent of carbide phases increases the hardness and improves the wear properties of coatings. A minimum of about 3 weight percent carbon may be necessary to impart adequate hardness into the coatings. If the carbon exceeds about 8 weight percent, the volume percent of carbide phases may become too high causing brittleness.

Increasing the concentration of nickel may also tend to increase the deposition efficiency by thermal spraying. Because total nickel levels above about 30 weight percent may tend to soften the coating and limit the wear resistance of the coating, the total concentration of nickel may best be maintained above about 10 weight percent and below about 30 weight percent.

The thickness of the thermal spray coatings of this invention, for example, the thickness of the coating formed on an outer peripheral surface of the piston ring, is typically from about 25 micrometers to about 500 micrometers, preferably from about 50 micrometers to about 250 micrometers, and more preferably from about 60 micrometers to about 140 micrometers. When the thickness of the thermal spray coating is less than about 25 micrometers, the piston ring fails to achieve a predetermined life expectancy. When the thickness of the thermal spray coating exceeds about 500 micrometers, the coating may exhibit excessive residual stresses causing spalling or peeling.

A coated piston ring is typically used in combination with a cylinder liner (e.g., cast iron). The piston ring is typically made of steels such as carbon steel, low alloy steel, or cast iron such as spheroidal graphite cast iron. To reduce abradability on the cylinder liner, the bimetallic carbides of chromium and molybdenum (dispersed in the matrix metal) have an average particle or grain size of less than about 8 microns, preferably less than about 4 microns, and more preferably less than about 2 microns. When the average particle size of the bimetallic carbides of chromium and molybdenum exceeds about 8 microns, the particles function as abrasive grains resulting in greater wear of the cylinder liner.

When the bimetallic carbides of chromium and molybdenum function as abrasive grains projecting from the surface of the coating or free abrasive grains debonded from the coating, the piston ring wears or abrades the cylinder liner. The bimetallic carbides of chromium and molybdenum preferably have fine size to prevent them from functioning as abrasive grains. Preferably, the bimetallic carbides of chromium and molybdenum are round or have soft edges.

The coatings of this invention can have a porosity of from about 0.2 percent to about 5 percent by volume, preferably from about 0.4 percent to about 3 percent by volume, and more preferably from about 0.5 percent to about 1.5 percent by volume, based on the entire thermal spray coating. When the porosity exceeds about 5 percent by volume, the wear resistance decreases.

The coatings of this invention preferably have sufficient microstructure, hardness and wear resistance such that the coatings can suppress the wear of the cylinder liners. The average hardness of the thermal spray coatings of this invention is at least about 500 Hv0.1, preferably at least about 650 Hv0.1, and more preferably at least about 800 Hv0.1. The hardness of the thermal spray coatings is expressed by Vickers hardness according to JIS Z 2244.

The coatings of this invention have a surface roughness sufficient to prevent wear of the mating member or cylinder liner by sliding. The coating surface is finished to provide the smooth sliding surface. The finished sliding surfaces have a surface roughness less than about 1.0 micrometers, preferably less than about 0.5 micrometers, and more preferably less than about 0.1 micrometers. The surface roughness is based on arithmetic mean average roughness Ra. When the surface roughness exceeds about 1.0 micrometers, the piston ring is more abrasive on the cylinder liner.

Other ingredients may be added to the coatings of this invention. For example, because ceramic powders such as tungsten carbide have high melting points and high hardness, they may be added to improve wear resistance.

The powders of this invention are useful for forming coatings on objects having excellent wear, corrosion and high temperature oxidation properties, for example, coatings for protecting surfaces undergoing sliding contact with other surfaces such as piston rings and cylinder liners of internal combustion engines.

The examples that follow are intended as an illustration of certain preferred embodiments of the invention, and no limitation of the invention is implied.

Example 1

A standard CrC/NiCr, spray dried and sintered, thermal spray powder (Praxair 1375VM) was blended with MoO3. This powder mix was heated in a hydrogen furnace to reduce the MoO3. The resulting molybdenum (Mo) was found in both the carbide grains and the metallic matrix. This powder was separated into an appropriate thermal spray size (10-50 μm) and sprayed by JP-5000 (HVOF) to form a thermal spray coating upon a steel substrate. Standard spray parameters were utilized for CrC/NiCr coatings. The surface of the coating sample was ground to 0.5 μm Ra and used to evaluate the abrasion resistance of the coating by ASTM G-65 (dry sand, rubber wheel). The sand abrasion resistance is set forth in Table A below.

Example 2

For comparison purposes, two other samples were prepared. A standard CrC/NiCr, spray dried and sintered, thermal spray powder (Praxair 1375VM) was sprayed by JP-5000 (HVOF). Standard spray parameters were utilized for CrC/NiCr coatings. Additionally, this same CrC/NiCr powder was used again to make a simple blend of CrC/NiCr plus 20% (by weight) molybdenum (1375VM+Mo). These two comparison samples were also ground to approximately 0.5 µm Ra and were evaluated by ASTM G-65 (dry sand, rubber wheel) to measure their resistance to abrasion. Table A sets forth the wear rate of each sample (material volume removed by sand in mm$^3$ per 1,000 revolutions). The wear rate for a chromium plated sample (as a reference) is also set forth in Table A.

TABLE A

| Material | Scar Volume |
|---|---|
| Cr-Plate | 8.3 |
| 1375VM + Mo | 4.3 |
| 1375VM | 3.9 |
| Example 1 | 2.6 |

In Table A, the Example 1 coating shows less volume loss which represents more resistance to abrasion.

Other variations and modifications of this invention will be obvious to those skilled in the art. This invention is not limited except as set forth in the claims.

The invention claimed is:

1. A powder useful for deposition through a thermal spray device, said powder comprising bimetallic carbides of chromium and molybdenum dispersed in a matrix metal, said matrix metal based on nickel/chromium/molybdenum, wherein the powder further comprises a carbon concentration of greater than 3.5 wt % but no greater than 6.5 wt %.

2. The powder of claim 1 which comprises from about 45 to about 75 weight percent chromium, from about 8 to about 35 weight percent molybdenum, from about 10 to about 30 weight percent nickel.

3. The powder of claim 1 which comprises from about 50 to about 70 weight percent chromium, from about 12 to about 30 weight percent molybdenum, from about 15 to about 25 weight percent nickel.

4. The powder of claim 1 comprising powder particles, said powder particles comprising bimetallic carbides of chromium and molybdenum dispersed in a matrix metal, said matrix metal based on nickel/chromium/molybdenum, said powder particles having an average particle size (agglomerated) of from about 5 micrometers to about 55 micrometers.

5. The powder of claim 1 comprising powder particles, said powder particles comprising bimetallic carbides of chromium and molybdenum dispersed in a matrix metal, said matrix metal based on nickel/chromium/molybdenum, said powder particles having an average particle size (agglomerated) of from about 15 micrometers to about 50 micrometers.

6. The powder of claim 1 wherein said bimetallic carbides of chromium and molybdenum have a particle or grain size of less than about 8 microns.

7. The powder of claim 1 wherein said bimetallic carbides of chromium and molybdenum have a particle or grain size of less than about 4 microns.

8. The powder of claim 1 wherein said thermal spray device is selected from detonation gun, high velocity oxygen fuel (HVOF) and plasma.

9. A process for preparing a powder useful for deposition through a thermal spray device according to claim 1, said powder comprising bimetallic carbides of chromium and molybdenum dispersed in a matrix metal, said matrix metal based on nickel/chromium/molybdenum; wherein said process comprises (i) providing a blend of $Cr_3C_2$, NiCr and MoOx (wherein x is a value of from about 0 to about 3), (ii) subjecting said blend to a reducing atmosphere under conditions sufficient to produce said bimetallic carbides of chromium and molybdenum, and (iii) dispersing said bimetallic carbides of chromium and molybdenum in said matrix metal.

10. The process of claim 9 wherein the blend comprises agglomerated $Cr_3C_2$/NiCr and MoOx.

11. The process of claim 9 wherein the reducing atmosphere is created in a hydrogen pusher furnace and/or in a vacuum furnace.

12. The process of claim 9 wherein said powder comprises from about 45 to about 75 weight percent chromium, from about 8 to about 35 weight percent molybdenum, from about 10 to about 30 weight percent nickel, and from about 3 to about 8 weight percent carbon.

13. The process of claim 9 wherein said powder comprises from about 50 to about 70 weight percent chromium, from about 12 to about 30 weight percent molybdenum, from about 15 to about 25 weight percent nickel, and from about 3.5 to about 6.5 weight percent carbon.

14. The process of claim 9 wherein said powder comprises powder particles, said powder particles comprising bimetallic carbides of chromium and molybdenum dispersed in a matrix metal, said matrix metal based on nickel/chromium/molybdenum, said powder particles having an average particle size (agglomerated) of from about 5 micrometers to about 55 micrometers.

15. The process of claim 9 wherein said powder comprises powder particles, said powder particles comprising bimetallic carbides of chromium and molybdenum dispersed in a matrix metal, said matrix metal based on nickel/chromium/molybdenum, said powder particles having an average particle size (agglomerated) of from about 15 micrometers to about 50 micrometers.

16. The process of claim 9 wherein said bimetallic carbides of chromium and molybdenum have a particle or grain size of less than about 8 microns.

17. The process of claim 9 wherein said bimetallic carbides of chromium and molybdenum have a particle or grain size of less than about 4 microns.

18. The process of claim 9 wherein said thermal spray device is selected from detonation gun, high velocity oxygen fuel (HVOF) and plasma.

* * * * *